INVENTOR
SUNE OTTO GUNNAR JONSSON

BY Hane and Nydink

ATTORNEYS

# United States Patent Office 3,476,117
Patented Nov. 4, 1969

3,476,117
CAPACITOR DISCHARGE MEDICAL STIMULATOR
Sune Otto Gunnar Jonsson, Karlskoga, Sweden, assignor to Aktiebolaget Bofors, Bofors, Sweden, a corporation of Sweden
Filed Oct. 18, 1965, Ser. No. 497,382
Claims priority, application Sweden, Oct. 26, 1964, 12,891/64
Int. Cl. A61h 23/00; A61n 1/32
U.S. Cl. 128—421         11 Claims

ABSTRACT OF THE DISCLOSURE

A medical stimulator supplies current pulses from a controllably discharged capacitor to a body member such as a tooth. The capacitor is charged from a voltage source via a resistor and a rectifier. The capacitor is discharged by closing a circuit via a pulse actuated pentode wherein the circuit includes the capacitor and the body member.

---

The present invention relates to medical stimulators and is more particularly concerned with an improvement in the arrangement for transmitting current pulses from a stimulator.

The following description is directed to a dental stimulator by way of example. However the invention is not limited to dental stimulators, but can be used in all types of stimulators operating with current pulses.

The purpose of a dental stimulator is to supply to a tooth a current pulse, usually a square pulse, of comparatively short duration (10 milliseconds is a value which is usual in practice) and at current (peak amplitude) within a range of, for instance, from 1 to 100 microamperes. These square pulses are to be delivered as a regular sequence of pulses of, for instance, one or two pulses per second, or as individual pulses at arbitrary times. In stimulators for other medical purposes, other conditions with respect to pulse length, pulse interval and amplitude will, of course, occur.

Because a tooth generally has a very high resistance, a relatively high voltage will generally have to be used to obtain the desired pulse amplitude, and it was found in practice that in some cases voltages amounting to a few hundred volts will be necessary. When using such a high voltage, there is a danger that on failure of a component in the system the current may be so great that a patient may be injured. An object of the present invention is to provide an apparatus wherein this danger is minimized.

In order to obtain a desired current pulse amplitude in a stimulator, it is usual that the pulse circuit includes a current limiting means, which, in most cases, consists of an electron discharge device having current limiting properties, for instance, an electron tube of the pentode type. In some prior art apparatus, a part of the body intended to be influenced by the current pulse (in a dental stimulator, a tooth) has been included in a circuit from a voltage source which was closed through that part of the body and the current limiting means.

In order to reduce the danger of injury to the patient, the apparatus just described has been modified, in accordance with a previous suggestion, so that the voltage source, instead of feeding the current pulse circuit, has been used to charge a capacitor whereupon this capacitor has served as the voltage source for the current pulse circuit. It is obvious that in this manner the danger of injury to a patient is considerably reduced since a capacitor contains only a predetermined quantity of energy which can be controlled by selecting the size of the capacitor.

The present invention is concerned with an improvement of an apparatus of the type just referred to. Thus, the invention relates to an improvement in stimulators for medicinal purposes comprising a circuit for delivery current pulses through a patient's body member, the circuit including a capacitor, adapted to be charged from a voltage source, in series with a current limiting electron discharge device.

The characteristic feature of the present invention is that to charge the capacitor from the voltage source, the capacitor in series with a rectifier element passing the charging current is connected in parallel to the electron discharge device, means being provided to connect the patient's body member in parallel to the rectifier element.

The invention will be described more in detail with reference to the accompanying drawing wherein.

Figure 1:
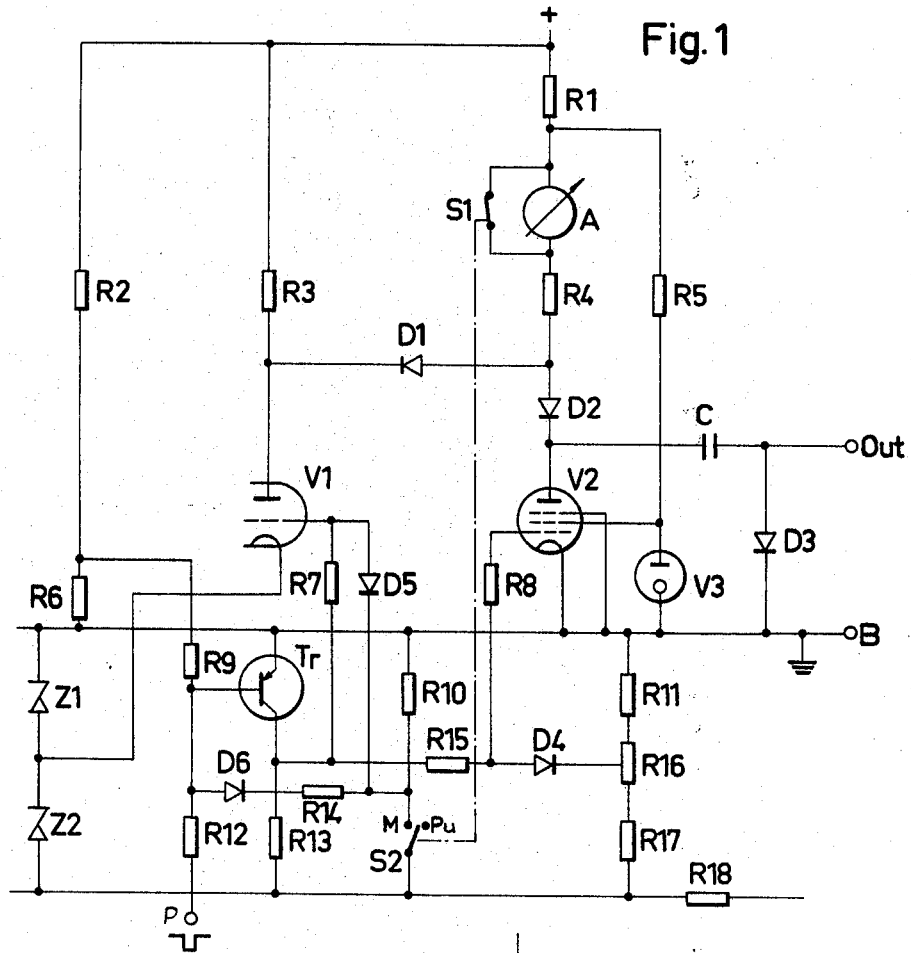
FIG. 1 shows a diagram for the output stage of a dental stimulator.

Referring to FIG. 1, the dental stimulator shown therein includes a current limiting electron discharge device comprising a pentode tube V2, the anode of which obtains anode voltage from a terminal (designated with +) of a voltage source through a first resistor R1, a current measuring instrument A which can be short-circuited by a switch S1, a second resistor R4 and a diode D2. The cathode of the pentode V2 is connected to a grounded point, and the screen grid of the pentode obtains a constant voltage relative to ground by the cooperation of a resistor R5 and a constant voltage tube V3, for instance, a gas-filled discharge tube (neon tube).

Also connected to the anode of the pentode V2 is one plate of a capacitor C, the opposite plate is coupled to an electrode connection denoted "OUT" intended to be connected to the tooth to be examined and also to ground over a diode D3.

A second electrode connection B, which is grounded, is connected to the human body in such a way that the tooth is connected in parallel with the diode D3.

To obtain some bias voltage and auxiliary voltages described below, which are negative relative to ground the + terminal of the voltage source is connected to the − terminal thereof over a chain of resistors, wherein the resistors R2 and R6 are between the + terminal and ground while the resistors R11, R16, R17 and R18 are between ground and the − terminal. To obtain voltage stabilization, the series connection of resistors R11, R16 and R17 is bridged by two zener diodes Z1 and Z2. To obtain adjustability of the bias voltage applied to the control grid of the pentode V2, the bias voltage determining the plate current through the pentode V2, the resistor R16 is formed as a potentiometer from the movable taps of which a variable voltage can be taken.

To enable the capacitor C to be changed to a suitable voltage and the voltage source then disconnected from the capacitor, there is a further electron discharge device V1, which is shown as a triode tube. The tube V1 has its anode connected to the + terminal through a resistor R3, and the anode is also, through a diode D1, connected to the connecting point between the resistor R4 and the diode D2. The diode D1 is arranged to pass current to the anode of the tube V1. The tube V1 also has its cathode connected to the connecting point between the zener diodes Z1 and Z2, and the control grid of the tube is connected over the resistor R7 and the diode D5 to a transistor circuit, which comprises the transistor Tr and further circuit components consisting of resistors and diodes.

To make it possible to change over from a measuring position where an adjustable constant current flows through the pentode V2 and a pulsing position where the capacitor C is first charged and then discharged in pulses through the pentode V2 and the patient, there is provided a switch S2 mechanically connected to the above-mentioned switch S1, the closed position of switch S2 corresponding to the measuring position and open position thereof to the pulsing position. The switch S1 is closed when the switch S2 is open.

To obtain the above mentioned discharge pulses from the capacitor C, square pulses are taken from a pulse generator (not shown) and are applied to the connection P and are of negative polarity. These pulses are applied to the base of the transistor Tr over the resistor R12. The transistor Tr obtains a bias voltage on its base by means of resistors R6 and R9. The emitter of the transistor Tr is grounded and its collector is connected to the − terminal of the voltage source through the resistor R13 which forms the collector loading, and the resistor R18. The collector of the transistor Tr is connected to the control grid of the triode V1 through the resistor R7.

Furthermore, the collector of transistor Tr is connected to the movable tap of the potentiometer R16 over a resistor R15 and the diode D4. The diode D5 which is connected to the control grid of tube V1, has its cathode joined to a circuit connected at one end to a point between resistors R12 and R9 and comprising a diode D6 and resistors R14 and R10 in series, this circuit having its other end connected to ground. The cathode connection of diode D5 which is joined to a point between resistors R14 and R10, is also connected to a switch S2.

The circuit arrangement described above operates as follows:

Supposing first that the switch is in the measuring position, i.e., switch S2 is closed and switch S1 is open, in this case, the base of the transistor Tr will be connected through the diode D6, the resistor R14 and the switch S2 to a considerable negative voltage, and the base will have applied to it such a bias voltage that the transistor Tr bottoms, that is, it transmits maximum current and has a very low voltage drop between its emitter and collector. Therefore, the collector of the transistor Tr will be substantially at ground potential. Since the switch S2 is closed, a circuit will be set up from the collector through the resistor R7 and diode D5 to the low voltage on the lead joined to the connecting point between resistors R17 and R18. In this case, the diode D5 is conducting and a considerable voltage drop occurs across resistor R7 due to the current flowing therethrough. The control grid of triode V1 will obtain such a negative voltage relative to the cathode of the triode that the triode is cut off. Thereby, the diode D1 will be cut off, since its cathode will obtain the voltage of the + terminal through the resistor R3, while its anode will be at a lower voltage on account of the voltage drops in the resistors R1 and R4. Furthermore, the diode D4 will be conducting in a circuit from the collector over resistor R15 to the movable tap of the potentiometer R16, and since the diode D4 has little voltage drop, the control grid of the pentode V2 will obtain through the resistor R8 a bias voltage which is substantially equal to the voltage on the movable tap of the potentiometer R16. A current will flow through the pentode V2 from the anode to ground, and when the pentode is suitably selected and operates under suitable conditions, this current is in a given range only slightly dependent on the anode voltage of the pentode.

The anode current of the pentode is obtained from the + terminal over resistor R1, the instrument A, the resistor R4 and the diode D2. Supposing that at the outset the capacitor has no charge, there will first occur a charging of the capacitor, and this charging process takes place through the diode D3 to ground and continues until the capacitor C has the same voltage as the anode of the pentode V2 would have under the conditions adjusted to and with the capacitor C disconnected. When charging of the capacitor C ceases, the instrument A will indicate the current flowing through the pentode at the prevailing adjustment of the potentiometer R16.

In the manner just described, an indication is obtained from the instrument A of the current which will pass through the pentode V2 on subsequent discharging of the capacitor C.

It will now be supposed that the switch S2 is set in the pulsing position, whereby the switch S2 opens and the switch S1 closes to short-circuit the instrument A. In the position indicated, with the switch S2 open, in the absence of a pulse at the connection P, the transistor Tr will obtain a bias voltage through R6 and R9 which is such that the transistor does not transmit current. The result is that the collector will exhibit a considerable negative voltage relatively to ground, and this negative voltage is applied via resistors R7 to the control grid of the tube V1, which is cut off. It will be noted that the diode D4 is cut off and does not permit the less negative voltage of the movable tap of potentiometer R16 to assert itself.

Both the triode V1 and the pentode V2 being cut off, the capacitor C will be charged in the manner indicated in a circuit from the + terminal via the resistor R1, the switch S1 (which protects the instrument A from the powerful charging currents which may occur), the resistor R4, the diode D2, the capacitor C and the diode D3 to ground.

On the arrival of a pulse of sufficiently negative amplitude at the connection P, however, the base of the transistor Tr will be so negative, for the duration of that pulse, that the transistor Tr bottoms. The collector of the transistor will take approximately ground potential, and in the same way as explained above, the control grid voltage of the pentode V2 will be governed by the voltage on the movable tap of the potentiometer R16, and thus, the operating conditions of the pentode V2 are determined by this control grid voltage and the constant screen grid voltage determined by the constant voltage tube V3. Since the anode current of a pentode, within relatively wide limits, is not influenced by the anode voltage, the current through the tube obtained by discharge of the capacitor C if a conducting connection exits between the connection points OUT and B, (the diode D3 blocks the discharge current) will be practically wholly predetermined, even for widely varying values of the voltage of capacitor C and the value of the impedance present between the connecting OUT and B (the tooth intended to be examined). Therefore, the discharge current from the capacitor C will, with good approximation, be equal to that indicated by the instrument A in the measuring position, provided that the adjustment of the potentiometer R16 has not been changed in the meantime.

In order to prevent that on discharge of the capacitor C a further current flows to the pentode V2 from the + terminal over the diode D2, this diode is to be cut off while the negative pulse is applied to the connection P. This is achieved with the switches in the pulsing position, by the control grid of triode V1 being at substantially zero voltage and thus a strong positive bias voltage relative to the cathode of the tube V1 which is at the negative connecting point between the zener diodes V1 and Z2. Thus, a strong anode current will flow through the triode V1 and the voltage drop across V1 will be small, while the major portion of the voltage drop between the + terminal and ground will be across resistor R3. The diode D1 will have its anode connected to a low positive voltage and a portion of the current to the anode of triode V1 will be obtained from the + terminal over R1, switch S1, resistor R4 and diode D1. Hence, the anode of diode D2 will be connected to a lower positive voltage than the cathode of diode D2, connected to the capacitor C which is charged to a high voltage. Thus, the diode D2 will be cut off and does not influence the discharge of the capacitor C through pentode V2.

As above noted, due to the diode D3 connected between the capacitor C and ground to enable the capacitor to be charged, the diode blocking the discharge current, the capacitor C can be discharged, when a pulse is present at the connection P, only through the patient's body member to be examined and which is connected across the connecting points OUT and B. In a dental stimulator, the connection B is usually a hand-held electrode while the electrode provided to supply the current to the tooth is joined to the connection OUT.

The pulse supplied to the connection P has such a base voltage (during the intervals between the pulses) that the same conditions exist which are described for the measuring position.

The pulses supplied to the connection P will be obtained from a suitable pulse generator (not shown) which will preferably be combined with the apparatus described to form a unit, means being provided, as desired, to supply to the connection P a sequence of pulses or individual pulses on actuation of manual control means.

In a practical embodiment of the apparatus shown in FIG. 1, satisfactory operation was obtained using the following components and operating conditions:

| | |
|---|---|
| R1 | kilo-ohms 4.7 |
| R2 | do 220 |
| R3 | do 470 |
| R4 | do 510 |
| R5 | do 220 |
| R6 | do 10 |
| R7 | do 47 |
| R8 | do 1 |
| R9 | do 22 |
| R10 | do 100 |
| R11 | do 60 |
| R12 | do 15 |
| R13 | do 47 |
| R14 | do 100 |
| R15 | do 470 |
| R16 | do 47 |
| R17 | do 30 |
| R18 | do 4.7 |
| V1 (one section) | 12AT7 |
| V2 | 6BA6 |
| V3 | 5651 |
| D1 | IN3728 |
| D2 | IN3728 |
| D3 | IN3728 |
| D4 | OA202 |
| D5 | OA202 |
| D6 | OA200 |
| Z1 | OAZ213 |
| Z2 | ZL47 |
| Tr | ACY17 |
| C | microfarad 0.1 |
| Voltage between + and ground | volts 320 |
| Voltage between ground and − | do 140 |

Figure 2:
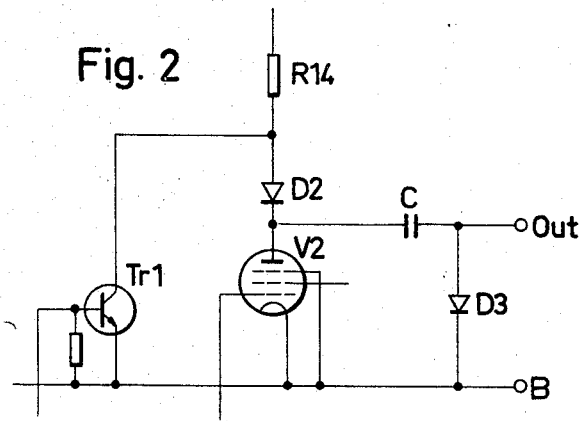
FIG. 2 shows a modification of the device shown in FIG. 1.

FIG. 2 shows a modification of the apparatus illustrated in FIG. 1, wherein the triode V1 is replaced by a transistor Tr1 which operates in the same way as the triode V1 to pass a strong current during the pulse but no current in the pulse intervals. This transistor Tr1 has its bias voltage on the base thereof governed by the transistor Tr shown in FIG. 1. Otherwise, the starting position is the same as that shown in FIG. 1. It should be pointed out in this connection that the transistor Tr can, of course, be replaced by an electron tube, in which case obvious modifications of the circuit arrangement must be made.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

I claim:

1. A stimulator for medical purposes comprising a capacitor, a voltage source, means including at least one resistor and a rectifier for connecting said capacitor and said voltage source in a series circuit, a pair of output terminals, each of said terminals being connected to one side of said rectifier, respectively, and adapted to be connected to a patient's body member, a first electron discharge device switchable between states of conduction and non-conduction, said electron discharge device having a high internal impedance, means for connecting said electron discharge device in a series circuit including said output terminals and said capacitor so that when a body member is connected to said output terminals and said electron discharge device is switched to the conducting state, said capacitor discharges through the circuit including said electron discharge device, one of said output terminals, said body member and the other output terminal with a current determined by said electron discharge device, and means for disconnecting said voltage source from said capacitor during the discharge of the latter.

2. The stimulator of claim 1 wherein said disconnecting means comprises a first diode having a cathode connected to said capacitor and to said electron discharge device, and having an anode connected to said voltage source, and conduction control means for applying a potential to said anode during the discharge of said capacitor, a potential of sufficient amplitude and polarity to prevent conduction of said diode.

3. The stimulator of claim 2 wherein said conduction control means comprises a further diode having an anode connected to said anode of said first diode and a further electron discharge device connected to the cathode of said second diode, and means for controlling said further discharge device to conduct only during the times of discharge of said capacitor.

4. Apparatus according to claim 3 in which the further electron discharge device comprises an electron tube of triode type.

5. Apparatus according to claim 3 in which the further electron discharge device comprises a transistor.

6. Apparatus according to claim 3 in which the first electron discharge device passes an adjustable current in the conduction state and is cut off in the non-conduction state.

7. Apparatus according to claim 3 wherein said electron discharge devices include control electrodes and in which the flow of current through said electron discharge devices is governed by voltages applied to the control electrodes of said electron discharge devices.

8. Apparatus according to claim 7 further comprising a controllable auxiliary electron discharge device which is controllable by a pulse to hold the control electrode of the first electron discharge device at an adjustable voltage during the pulse.

9. Apparatus according to claim 8, in which the auxiliary electron discharge device is a transistor.

10. Apparatus according to claim 8 in which the auxiliary electron discharge device imparts to the further electron discharge device during the pulse a voltage to the associated control electrode such that a very strong current flows through the further electron discharge device.

11. Apparatus according to claim 1 in which the electron discharge device is an electron tube of pentode type.

References Cited

UNITED STATES PATENTS 3,169,212    2/1965    Walters _____ 320—1 X

OTHER REFERENCES

Surgery, vol. 36, No. 4, October 1954, p. 845.

WILLIAM E. KAMM, Primary Examiner